US006807846B2

(12) United States Patent
Leonard et al.

(10) Patent No.: US 6,807,846 B2
(45) Date of Patent: Oct. 26, 2004

(54) MOBILE PNEUMATIC APPARATUS AND METHOD FOR TESTING A CONTAINER SEAL

(75) Inventors: John J. Leonard, Lockport, IL (US); Steven Robert Ehardt, Algonquin, IL (US); Newell Esmond, Carpentersville, IL (US); Kurt Aaron Kreutzmann, Cary, IL (US); Timothy J. Hamilton, Elgin, IL (US); John Konieczka, Lake Barrington, IL (US)

(73) Assignee: The Quaker Oats Company, Chicago, IL (US)

(*) Notice: Subject to any disclaimer, the term of this patent is extended or adjusted under 35 U.S.C. 154(b) by 98 days.

(21) Appl. No.: 10/046,451

(22) Filed: Jan. 14, 2002

(65) Prior Publication Data

US 2002/0174711 A1 Nov. 28, 2002

Related U.S. Application Data

(63) Continuation of application No. 09/603,560, filed on Jun. 23, 2000, now Pat. No. 6,415,651.

(51) Int. Cl.[7] .............................................. G01M 3/34
(52) U.S. Cl. ...................................... 73/49.3; 73/49.2
(58) Field of Search .............................. 73/41.2, 41.3, 73/41.4, 45.5, 52, 49.2, 49.3

(56) References Cited

U.S. PATENT DOCUMENTS

| 265,837 A | 10/1882 | Mann |
| 778,622 A | 12/1904 | Ayars |
| 876,558 A | 1/1908 | Johnson |
| 1,042,558 A | * 10/1912 | Karp ........................... 73/45.5 |
| 1,421,562 A | 7/1922 | Raftery |
| 3,418,845 A | * 12/1968 | Helms ......................... 73/45.5 |
| 3,431,773 A | 3/1969 | Calhoun ...................... 73/49.2 |
| 3,683,676 A | 8/1972 | Hass |
| 3,712,112 A | * 1/1973 | Widmer et al. ................. 73/37 |
| 3,855,531 A | * 12/1974 | Fielibert et al. ............ 324/693 |
| 3,930,401 A | 1/1976 | Filler ......................... 73/49.2 |
| 3,958,448 A | 5/1976 | Willis et al. |
| 4,089,208 A | * 5/1978 | Franks et al. ................ 73/45.5 |
| 4,311,038 A | 1/1982 | Dunn .......................... 73/49.8 |
| 4,378,034 A | * 3/1983 | Albertson ...................... 141/1 |
| 4,528,840 A | 7/1985 | Wass |
| 4,736,623 A | 4/1988 | Brown et al. ................. 73/49.2 |

(List continued on next page.)

FOREIGN PATENT DOCUMENTS

DE 3827744 A1 * 2/1990 ............. B60S/1/50

*Primary Examiner*—Charles D. Garber
(74) *Attorney, Agent, or Firm*—Wallenstein Wagner & Rockey, Ltd.

(57) ABSTRACT

The present invention provides an apparatus and method for evaluating the integrity of a seal on liquid-filled container. According to one aspect of the invention, the apparatus comprises a tank for containing a liquid solution and a clamp with a first and second member between which the container is engaged. The clamp is positioned with respect to the tank such that a portion of the container properly situated in the clamp will extend into the tank and contact the liquid solution. A ram and cylinder are operatively connected to the clamp to engage the container. A seat is provided to support a portion of the container such that at least a portion of the container supported by the seat will extend into the tank. A drill is provided to pierce a surface of the container to make an opening. The drill is positioned such that the opening can be made while the container is in the clamp and/or the seat such that at least a portion of the container extends into the tank. The apparatus further includes a conductivity meter mounted on the platform, a first electrode attached to the drill, and a second electrode positioned such that at least a portion of the second electrode extends into the tank. According to another aspect of the invention, the tank, the clamp, the seat, and the ram and cylinder are mounted on a mobile platform. The present invention further relates to a method for evaluating a seal on a liquid-filled container.

25 Claims, 9 Drawing Sheets

U.S. PATENT DOCUMENTS

| | | | |
|---|---|---|---|
| 4,809,542 A | 3/1989 | Jones | 73/45.8 |
| 4,862,732 A | 9/1989 | Raymond et al. | |
| 5,065,617 A | 11/1991 | Toelke | 73/49.8 |
| 5,230,239 A | 7/1993 | Gentile | |
| 5,333,492 A | 8/1994 | Aarts | |
| 5,501,435 A * | 3/1996 | Monteiro | 269/24 |
| 5,507,177 A | 4/1996 | Focke | |
| 5,535,618 A | 7/1996 | Konieczka | 73/49.3 |
| 5,578,747 A | 11/1996 | Nottingham et al. | 73/40 |
| 5,642,898 A * | 7/1997 | Wise | 280/652 |
| 5,760,295 A | 6/1998 | Yasumoto | |
| 5,932,798 A | 8/1999 | Rea et al. | 73/49.8 |

* cited by examiner

MOBILE PNEUMATIC APPARATUS AND METHOD FOR TESTING A CONTAINER SEAL

RELATED APPLICATIONS

The present application is a continuation of application Ser. No. 09/603,560, filed Jun. 23, 2000 and issued as U.S. Pat. No. 6,415,651, upon which a claim of priority is based.

TECHNICAL FIELD

The present invention relates generally to an apparatus for evaluating the integrity of a container seal. More particularly, the present invention relates to an apparatus for evaluating the seal integrity of liquid-filled containers of varying sizes, and the method for evaluating such seals.

BACKGROUND OF THE INVENTION

Containers with resealable closures are used throughout the food and beverage industry. The closures are designed to prevent product leakage and yet they must provide the user with easy open access to the contents of the container. Resealable closures are appropriate when the container contents are beverages or food products because these closures enable consumers to dispense a desired portion of the beverage or food product and then reseal the remainder of the product for later consumption. One problem with this type of sealed container is leakage, which is more common with plastic containers.

For plastic containers, the leaks are primarily attributable to processing conditions such as heat exposure, finish abrasions, fill temperature, head space, pull-up range, and inversion. When the seal on a plastic container fails, the liquid or food contents of the container can become contaminated and the container is not suitable for sale to the public. As a result, the container and the contents must be discarded with the manufacturer experiencing a reduction in product output.

U.S. Pat. No. 5,535,618 to Konieczka and assigned to the assignee of this application, discloses a destructive method for testing for leaks in sealed containers. The method of that invention includes measuring for electrical conductivity between contents of a sealed container and an electrolyte solution in which the container is partially immersed. The method disclosed in the '618 patent detects a container seal leak if there is electric current flowing from an electrode in a solution to a second electrode positioned within the container contents. Conversely, if no electric current flow is detected, then the container seal is not leaking.

A device currently used in accordance with the teachings of the '618 patent for testing container seals requires the operator to perform two distinct, time consuming steps. In a first jig, the operator must pierce a surface of the container with a drill bit mounted in a drill press. Next, the operator must transport the container to a testing device and properly secure the container before beginning the testing procedure. Since the liquid contents of the container can be spilled while transporting the pierced container, the device has an inherent level of imprecision which can affect the accuracy of test results and the verification of earlier test results. In addition, the components comprising the testing devices are numerous and are not integrated into a single apparatus. As a result, the testing device is inefficiently packaged and consumes a disproportionate amount of workspace. Also, because the prior device is immobile, the operator is precluded from repositioning the testing device or temporarily moving the testing device closer to or away from the container production line. Lastly, the prior conventional test apparatus employs a manually moved member to secure and deform the container during the test process. In the conventional apparatus, developing the necessary force to deform or squeeze the container requires muscular exertion by a human operator. Accordingly, the manually moved member is subject to variation based upon the individuality of the operation and the operator, which further reduces the precision of the testing results. Also, during the course of a typical day, the operator can experience some fatigue when repeatedly applying the necessary muscular exertion to the manually moved member. Further, the manually moved member (i.e. a hand crank) requires a significant time element to operate, which further reduces the sampling rate of the device. Consequently, there is a need for an efficiently packaged, mobile device with improved precision for testing a seal on a liquid-filled container at a higher sample rate.

SUMMARY OF THE INVENTION

The present invention provides an apparatus and method for evaluating the integrity of a container seal. In general terms, the container is liquid-filled and the container wall is capable of being deformed to increase pressure within the container.

According to one aspect of the invention, the apparatus comprises a tank for containing a liquid solution. Preferably, the liquid is an electrolyte composition.

According to another aspect of the invention, the apparatus further comprises a clamp with a first and second member between which the container is engaged. The clamp is positioned with respect to the tank such that a portion of the container properly situated in the clamp will extend into the tank such that the seal will be submersed in the electrolyte solution.

According to another aspect of the invention, a ram and cylinder are operatively connected to the clamp such that the clamp can be clampingly engaged about a container by relative movement between the ram and the cylinder. The clamp is comprised of a first member and a second member. The first member is connected to one of either the ram or cylinder in a manner such that the first member is displaced toward the second member by relative movement between the ram and cylinder.

According to another aspect of the invention, a seat is provided to support a portion of the container to establish a desired position of the container with respect to the clamp before clamping occurs. The seat is located and configured such that at least a portion of the container supported by the seat will extend into the tank. This permits the container to be precisely placed in a testing position when the clamp engages and deforms the container.

According to another aspect of the invention, a drill or like means is provided to pierce a wall of the container to make an opening into the container. The drill is located such that the opening can be made while the container is positioned in the seat. Preferably, the drill is vertically adjustable along a drill support and the drill is rotatable about the support.

According to another aspect of the invention, the tank, the clamp, the seat, and the ram and cylinder are mounted on a mobile platform. Also, the support can be mounted to the tank or on the mobile platform. The mobile platform can be configured to include utility connections (e.g. compressed air, or electricity) for the drill and the ram and cylinder.

According to another aspect of the invention, the apparatus further includes a conductivity meter mounted on the platform. The meter includes a first electrode and a second electrode. After the drill makes an opening in a wall of the container, the first electrode can be inserted into the opening such that at least a portion of the first electrode is immersed in the liquid contents of the container. The second electrode can be positioned such that at least a portion of the second electrode extends into the tank.

It is contemplated that further automation can be achieved under the invention by incorporating the first probe with a means for making the opening. For example, the probe itself may be provided with a sharp tip which could be pressed, rotated, or both, to penetrate the container wall by either manual manipulation or with a press. Also, a spinning electrical contact may be associated with the drill such that the drill will act as a first electrode and a conductivity reading can be made before the drill is withdrawn from the container.

In preferred embodiments of the invention, the apparatus will be capable of evaluating the seal on liquid-filled containers of different sizes. To this end, a number of engaging surfaces may be used to facilitate the engagement of the container and the clamp. Accordingly, the engaging surfaces are adapted for the testing of different sized containers.

The present invention further relates to a method for evaluating a seal on a liquid-filled container. The container seal is determined to be leaking when the conductivity meter detects a flow of electrons from one electrode to the other electrode. Conversely, the container seal is determined as not leaking when the conductivity meter does not detect a flow of electrons from one electrode to the other electrode.

DETAILED DESCRIPTION OF THE PREFERRED EMBODIMENT

Figure 1:
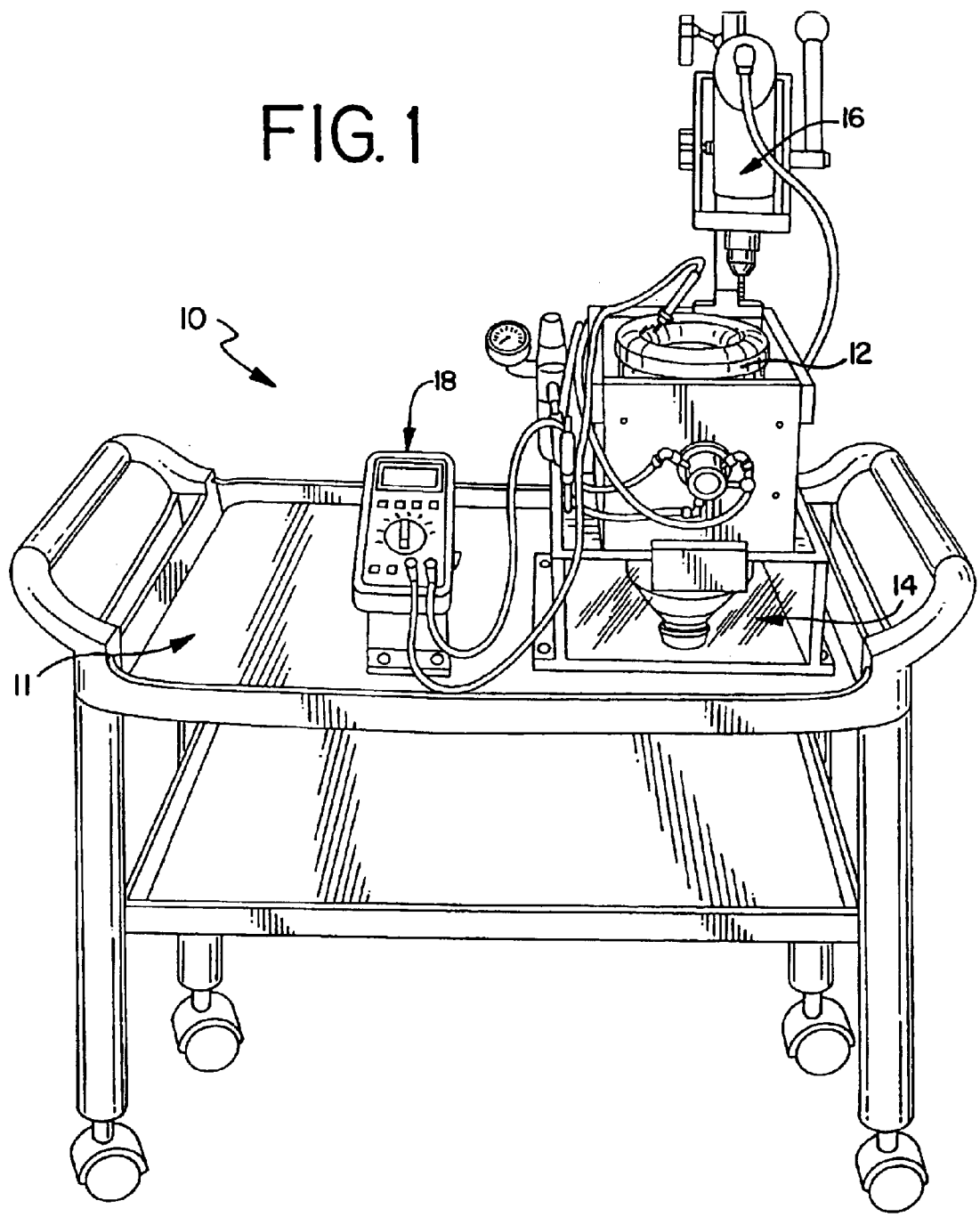
FIG. 1 is a perspective view of an apparatus 10 according to the invention.

While the invention is susceptible of embodiment in many different forms, there is shown in the drawings and will herein be described in detail preferred embodiments of the invention. It is to be understood that the present disclosure is to be considered as an exemplification of the principles of the invention. This disclosure is not intended to limit the broad aspect of the invention to the illustrated embodiments.

As shown in FIG. 1, the present invention provides an apparatus 10 for evaluating the integrity of a seal on a liquid-filled container 12. The apparatus 10, is mounted on a mobile platform 11. According to another aspect of the invention, the platform 11 also carries a tank 14, a drill 16, and a conductivity meter 18 of apparatus 10.

The mobile platform 11 allows the operator to vary the location and precise position of the apparatus 10 such that the apparatus 10 can be moved closer to or away from the container production line or to other container testing areas. In addition, the position of the mobile platform 11 can be varied to reduce operator fatigue. The tank 14 is configured to store a liquid solution, preferably an electrolyte solution. The tank 14 can be secured to the mobile platform 11 in a number of ways to prevent unwanted movement of the tank 14; however, the manner of securing the tank 14 should preferably permit the tank 14 to be removed from the mobile platform 11 for cleaning and maintenance.

In a preferred embodiment, the apparatus 10 includes a means for making an opening in a wall of the container 12. One means comprises a drill and a drill bit, either electrically or manually powered. One of ordinary skill will understand that a punch, a heated lance or any equivalent for drilling or piercing a wall of the container 12 will suffice. Preferably, the hole is made in a bottom wall of the container; however, in other embodiments the hole can be made in a sidewall of the container 12.

One goal of the invention is that a means for making an opening (i) neither obstruct nor make inconvenient the placing of a container in the clamp assembly 33, and (ii) while at the same time be relatively easily positionable with respect to the container after its lodgement in the assembly 33 so as to make the opening. Any structure accommodating this goal will accomplish this aspect of the invention. An exemplary embodiment is disclosed in FIG. 2.

Figure 2:
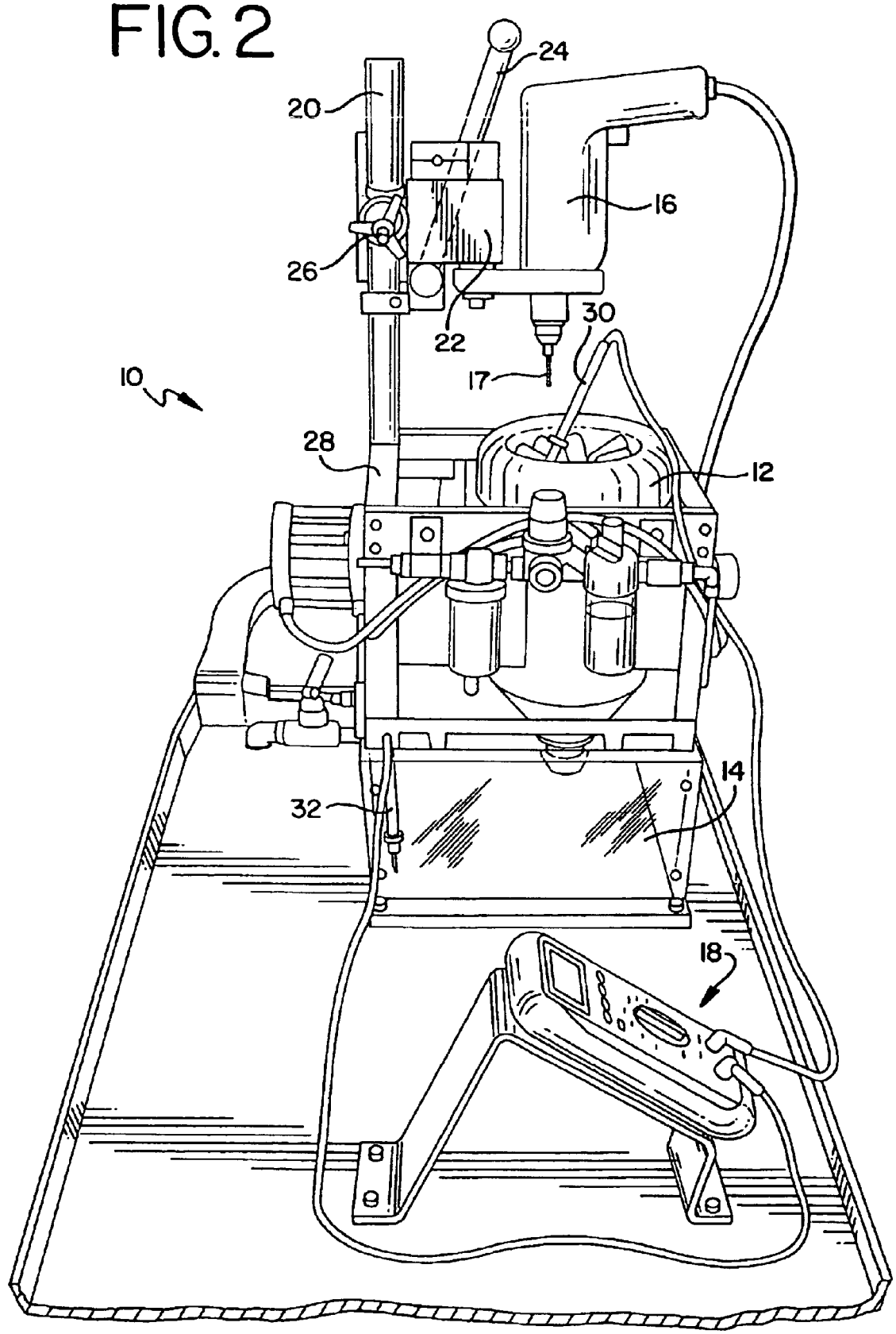
FIG. 2 is a perspective and partial view of the apparatus 10 of FIG. 1 from another perspective.

Referring to FIG. 2, the drill 16 and a drill bit 17 are positioned such that the opening can be made while the container 12 is resting in a seat (not shown). The drill 16 is connected to a support 20 by a mounting device 22. A lever 24 allows an operator to adjust the vertical position of the drill 16 along the support. A knob 26 allows an operator to rotate the drill 16 about the support 20 such that the drill 16 will not obstruct the placement of a container in the clamp assembly 33. Preferably, the drill 16 is mounted on the support 20 such that the drill 16 is vertically adjustable along the support 20 and rotatable about the support. The support 20 can be attached to a rear housing member 28 or to the mobile platform 11. Although the support 20 is shown in a vertical configuration, any combination of the support 20, the mounting device 22, the lever 24, and the knob 26 that allows dual movement of the drill 16 would be in conformity with the principles of the invention. The platform 11 can be configured to include an electrical connection and power supply for the drill 16.

The conductivity meter 18 is mounted on the platform 11. After the drill bit 17 makes an opening in the container 12, a first electrode 30 is inserted into the container opening. A second electrode 32 is positioned in the tank 14 such that at least a portion of the second electrode 32 extends into the tank 14. The first electrode 30 and the second electrode 32 can be connected to the meter 18 such that electrons are passed from the meter 18 to the first electrode 30 and then to the second electrode 32 and then back to the meter 18.

Figure 3:
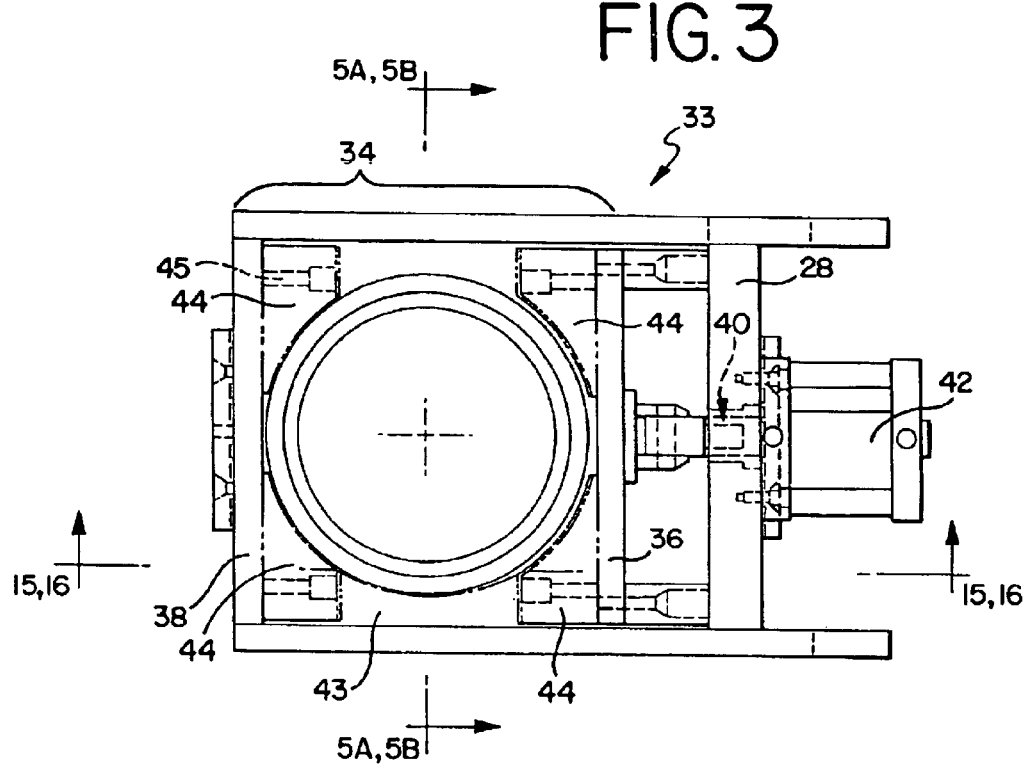
FIG. 3 is a top view of a clamp assembly 33 of the apparatus of FIG. 1.

Referring to FIG. 3, a clamp assembly 33 includes a clamp 34, a rear housing member 28, a ram 40, and a cylinder 42. The clamp 34 includes a first member 36 and a second member 38 between which a container 12 can be engaged. The clamp 34 is positioned with respect to the tank 14 such that at least a portion of a container (such as container 12) properly engaged in the clamp 34 will extend into the tank 14.

This represents a major distinction over the prior device employed by the Assignee of the '618 patent because an operator is now able to make a hole in the container 12 while the container 12 is positioned in the clamp 34 and tank 14 instead of transporting the container 12 a distance to the clamp 34 and tank 14 after making the hole.

In a preferred embodiment, the apparatus 10 includes a means for engaging a container 12 between the first member 36 and second member 38. The engaging means is operatively connected to the clamp 34. The engaging means typically comprises a ram and cylinder, which can be operated by pneumatic, hydraulic, electric or manual power. The engaging means can also include a motor, a crank, a crank with gears, or any equivalent capable of displacing the first member 36 towards the second member 38.

As shown in FIG. 3, the ram 40 and the cylinder 42 are connected to the clamp assembly 33 at the rear housing member 28. The ram 40 and the cylinder 42 are operatively connected to the clamp 34 such that the clamp 34 can be clampingly engaged about a container 12 by relative movement between the ram 40 and the cylinder 42. The first member 36 is connected to the ram 40 such that the first member 36 is displaced toward the second member 38 by relative movement between the ram 40 and the cylinder 42. In a preferred embodiment, the second member 38 is fixed; however, one of ordinary skill in the art will recognize the second member 38 could be connected to a second ram and cylinder (not shown) such that the second member 38 could also be displaced in a manner similar to the first member 36. One skilled in the art should recognize that the platform 11 can be configured to include a connection for compressed air to supply a pneumatic version of ram 40 and cylinder 42.

Figure 5A:
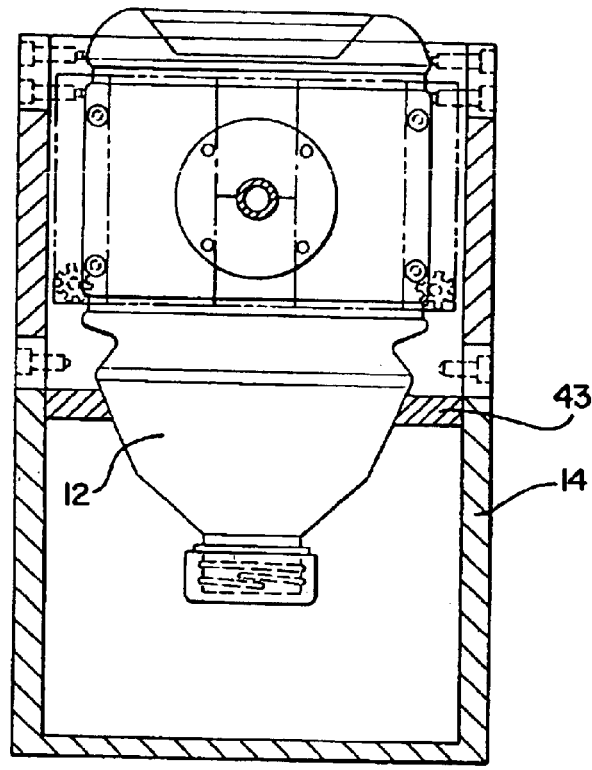
FIG. 5A is a cross-sectional view of the clamp assembly 33 of FIG. 3 along line 5A—5A, showing a container 12 positioned in a seat 43.
Figure 6:
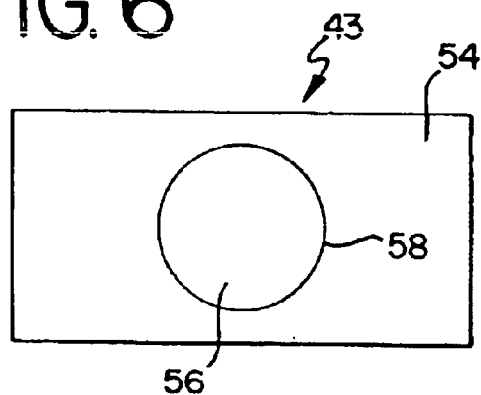
FIG. 6 is a plan view of a plate 54 with an aperture 56 defining a seat 43 of the clamp assembly 33 of FIG. 3.

As disclosed in FIGS. 3, 5A and 6, the clamp assembly 33 further includes a seat 43 adapted to support a portion of the container 12 to establish a desired position of the container 12 with respect to the clamp 34. The desired portion of the container 12 is defined as the position where at least a portion of a container 12 supported by the seat 43 will extend into an electrolyte solution in tank 14. In a preferred embodiment, the seat 43 is positioned above the tank 14; however, other seat 43 locations remain in conformity with the principles of the invention. The seat 43 could be a variety of shapes, including but not limited to a square, rectangle, circle, or triangle. The seat 43 could also be a combination of structural elements, such as forks or bars, configured to establish a structure upon which a portion of a container may rest while permitting the closure position of a container to extend into the tank 14.

In a preferred embodiment, the apparatus 10 includes a means for enhancing an ability of the clamp 34 to engage containers of different sizes. The enhancing means permits the apparatus to test different sized containers, i. e. large and small containers, thereby increasing the versatility and value of the apparatus 10. In the preferred embodiments disclosed in FIGS. 3, 4, 10, 11, 15 and 16, the means comprises a plurality of inserts, each with an engaging surface or a plurality of engaging surfaces.

Figure 4:
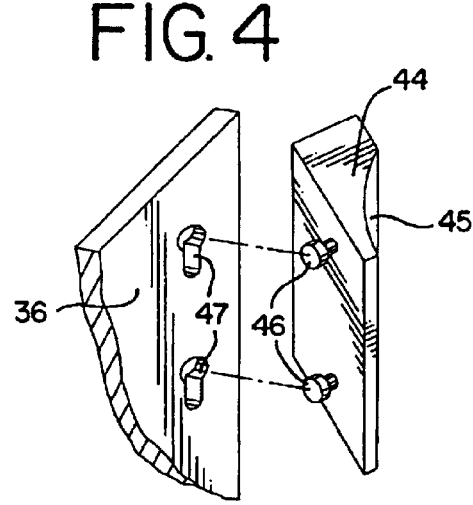
FIG. 4 is a partial cross-sectional view in perspective showing the interaction between an insert 44 and a clamp member 36 of the clamp assembly 33 of FIG. 3.

Referring to FIG. 3, an insert 44 can be removably attached to either the first member 36 or the second member 38. The insert 44 enhances the ability of the clamp 34 to engage containers of different shapes and sizes. The number, size, and configuration of inserts can vary depending on the size and shape of the container 12. For example, the insert 44 can include an internal passageway 45 for a fastener (not shown), which secures the insert 44 to member 38. Referring to FIG. 4, the insert 44 has an engaging surface 45 which comes into direct contact with an outer surface of the container 12 as the clamp 34 engages the container 12. The insert 44 can be attached to the members 36, 38 with an interconnecting set of lugs 46 and eyelets 47. One of ordinary skill in the art will recognize that the insert 44 could be integrated into either of the members 36, 38 to form an integral structure, the integral structure having a distinct engaging surface that contacts the outer surface of the container 12. Alternatively, the inserts could be omitted and the members 36, 38 could be configured with an engaging surface such as surface 45 adapted to contact the outer surface of the container 12.

Figure 5B:
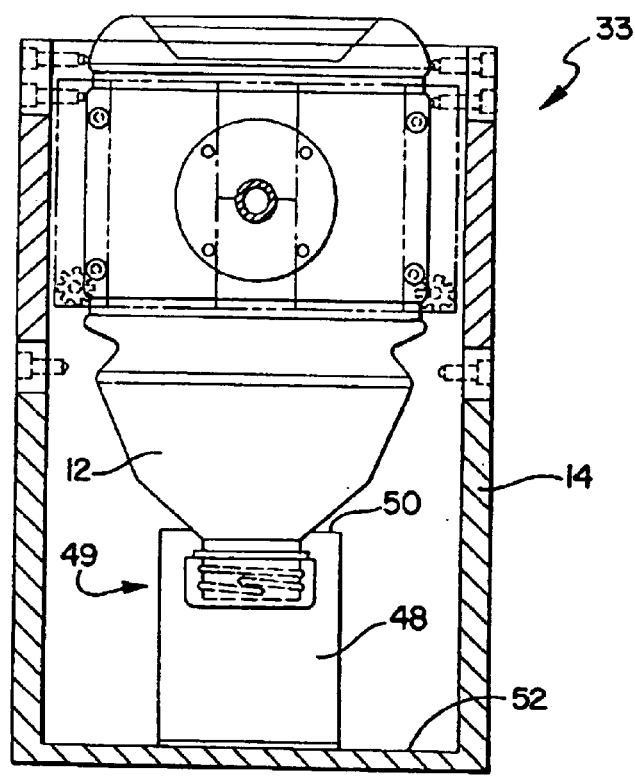
FIG. 5B in a cross-sectional view of the clamp assembly 35 of FIG. 3 along line 5B—5B showing a container 12 positioned in an alternate seat 49.

In another embodiment shown in FIG. 5B, the clamp assembly 33 is attached to the tank 14. A cylinder 48 is positioned in the tank 14 and a seat 49 is defined by a terminal edge 50 of the cylinder 48. Seat 49 is adapted to support a portion of the container 12 to establish a desired position of the container 12 with respect to the clamp 34. The desired portion of the container 12 is defined as the position where at least a portion of a container 12 supported by the seat 49 will extend into an electrolyte solution in tank 14. Although shown attached to a bottom surface 52 of the tank 14, the cylinder 48 could be elevated from the bottom surface 52 or attached to a side surface of the tank 14.

In a preferred embodiment shown in FIG. 6, the seat 43 includes a plate 54 interposed between the clamp 34 and tank 14 with an aperture 56 formed therein. The seat 43 is defined by a marginal edge 58 of an aperture 56. One of ordinary skill in the art will recognize that the plate 54 and the aperture 56 could be a variety of shapes, including but not limited to a square, rectangle, circle, or triangle, to accommodate varying container shapes.

Figure 7:
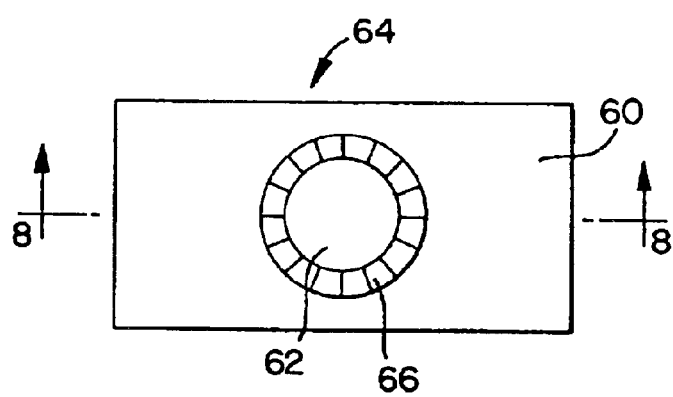
FIG. 7 is a top view of an alternate embodiment of a first plate 60 with a first aperture 62 defining a first seat 64 of the clamp assembly 33 of FIG. 3.
Figure 8:
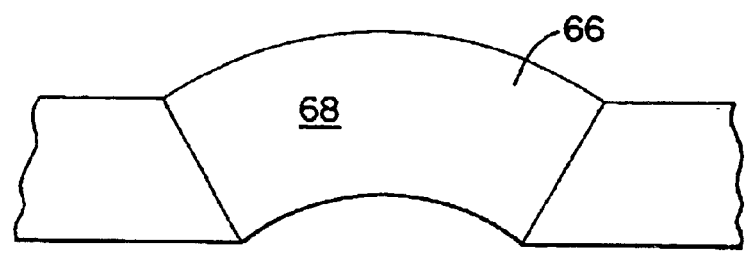
FIG. 8 is a partial cross-section perspective view of plate 64 taken along line 8—8 of FIG. 7, showing a tapered annular surface 68.

In another embodiment shown in FIG. 7, a first plate 60 is disposed between the clamp 34 and the tank 14, the first plate 60 having a first aperture 62. A first seat 64 is defined by a marginal edge 66 of the first aperture 62. The first seat 64 is adapted to support at least a portion of a first-sized container (not shown) such that at least a portion of a first-sized container will extend into the tank 14. Referring to FIG. 8, the marginal edge 66 has a tapered annular surface 68 that defines a frustaconical shape, which can better conform to a frustaconical portion of a container.

Figure 9A:
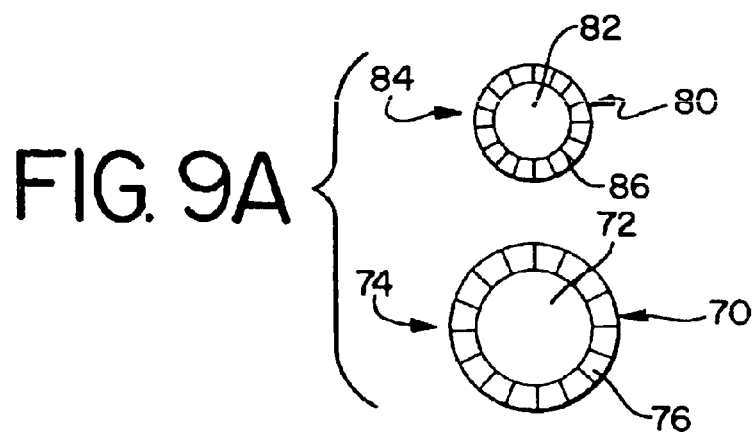
FIG. 9A is a top view of a second seat 74 and a third seat 84 of the clamp assembly 33 of FIG. 3.
Figure 9B:
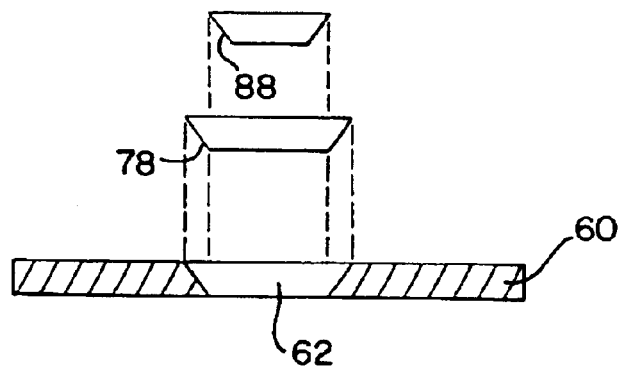
FIG. 9B is an exploded side view showing the nesting of the second seat 74 and third seat 84 in the first aperture 62 of the clamp assembly 33 of FIG. 3.

Referring to FIG. 9A, a second plate 70 has a second aperture 72 with a marginal edge 76. A second seat 74 is defined by the marginal edge 76. The second seat 74 is adapted to support at least a portion of a second-sized container (not shown) such that at least a portion of a second-sized container will extend into the tank 14. Referring to FIG. 9B, the marginal edge 76 has a tapered annular surface 78 that defines a frustaconical shape, which can better conform to a frustaconical portion of a container. The second plate 70 is nested or disposed in the first aperture 62.

A third plate 80 has a third aperture 82 with a marginal edge 86. A third seat 84 is defined by the marginal edge 86. The third seat 84 is adapted to support at least a portion of a third-sized container (not shown) such that at least a portion of a third-sized container will extend into the tank 14. Preferably, the marginal edge 94 has a tapered annular surface 88 that defines a frustaconical shape, which can better conform to a frustaconical portion of a container. The third plate 80 is nested or disposed in the second aperture 72. One of ordinary skill in the art will recognize that the plates 60, 70, 80 and seats 64, 74, 84 could be configured in a variety of shapes, including but not limited to a square, rectangle, oval, or triangle, and still remain within the principles of the invention. In addition, tapered surfaces 68, 78, 88 could be removed such that with minor modification, such as the addition of an extension ring to the peripheral edge of the seats, seats 64, 74, 84 could rest on top of each other. Seats 64, 74, 84 are adapted to support a portion of different sized containers to establish a desired position of the containers with respect to the clamp 34. The desired portion of a container is defined as the position where at least a portion of a container supported by the seat will extend into an electrolyte solution in tank 14. The first-, second-, and third-sized seats enable the apparatus 10 to support containers of different sizes for testing, which increases the versatility and value of the apparatus 10.

Figure 10:
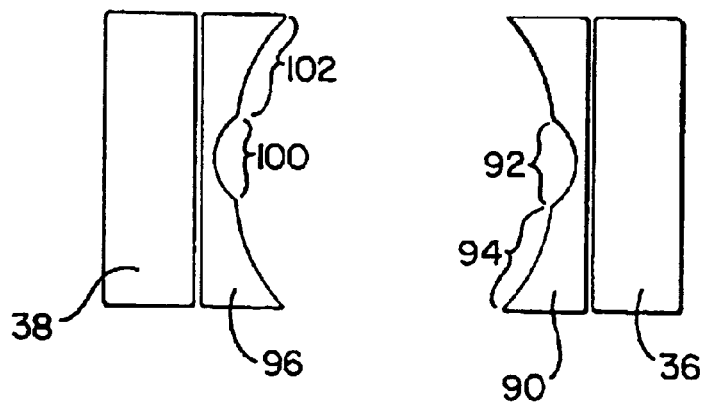
FIG. 10 is a plan view showing the interaction between a first member 36 and a first insert 90 and the interaction between a second member 38 and a second insert 96 of the clamp assembly 33 of FIG. 3.

In another embodiment disclosed in FIG. 10, a first insert 90 is attached to the first member 36 and enhances the ability of the first member 36 in engaging a container 12. The first insert 90 has a first engaging surface 91 with a first portion 92 adapted to conform to at least a portion of an outer surface of a first-sized container. The first engaging surface 91 can also have a second portion 94 adapted to conform to at least a portion of an outer surface of a second-sized container. A second insert 96 is attached to the second member 38 and enhances the ability of the second member 38 in engaging a container 12. The second insert 96 has a second engaging surface 98 with a first portion 100 adapted to conform to at least a portion of an outer surface of a first-sized container. The second engaging surface 98 can also have a second portion 102 adapted to conform to at least a portion of an outer surface of a second-sized container. The first portions 92, 100 and second portions 94, 102 enable the inserts 90, 96 to accommodate different sized containers. Although only first portions 92, 100 and second portions 94, 102 are shown, the inserts 90, 96 can be configured with surface of engaging portions, each of which would represent a distinct container size and shape. One of ordinary skill in art will recognize that the shape of the inserts 90, 96 and the first portions 92, 100 and second portions 90, 102 can be varied to accommodate the testing of irregular shaped containers. Also, the inserts 90, 96 could be permanently integrated into members 36, 38 to form an integral structure with distinct portions of an engaging surface, each of which could contact different sized containers. Alternatively, the inserts 90, 96 could be omitted and the members 36, 38 could have integrally shaped surfaces, each of which could contact different sized containers.

Figure 11:
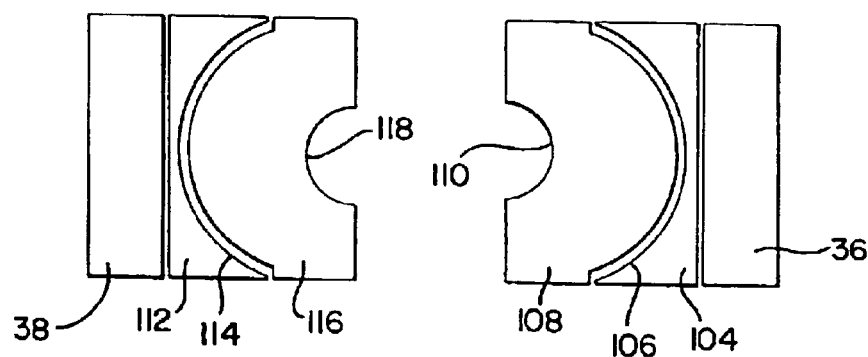
FIG. 11 is a plan view of an alternate embodiment showing the interaction between a first member 36, a first insert 104, and a second insert 108 and the interaction between a second member 38, a third insert 112, and a fourth insert 116 of the clamp assembly 33 of FIG. 3.

In another embodiment shown in FIG. 11, a first insert 104 is attached to the first member 36 and enhances the ability of the first member 36 in engaging a container 12. The first insert 104 has a first engaging surface 106, which conforms to at least a portion of an outer surface of a first-sized container. A second insert 108 is removably attached proximate the first engaging surface 106. The second insert 108 has a second engaging surface 110 adapted to conform to at least a portion of an outer surface of a second-sized container. A third insert 112 is attached to the second member 38 and enhances the ability of the second member 38 in engaging a container 12. The third insert 112 has a third engaging surface 114, which conforms to at least a portion of an outer surface of a first-sized container. A fourth insert 116 is removably attached proximate the third engaging surface 114. The fourth insert 116 has a fourth engaging surface 118 adapted to conform to at least a portion of an outer surface of a second-sized container. The inserts 104, 108, 112, and 116 enhances the ability of the clamp 34 to engage different sized surfaces representing different sized containers. As a result of this capability, the apparatus 10 can be used to evaluate the integrity of seals on different sized containers.

Figure 12:
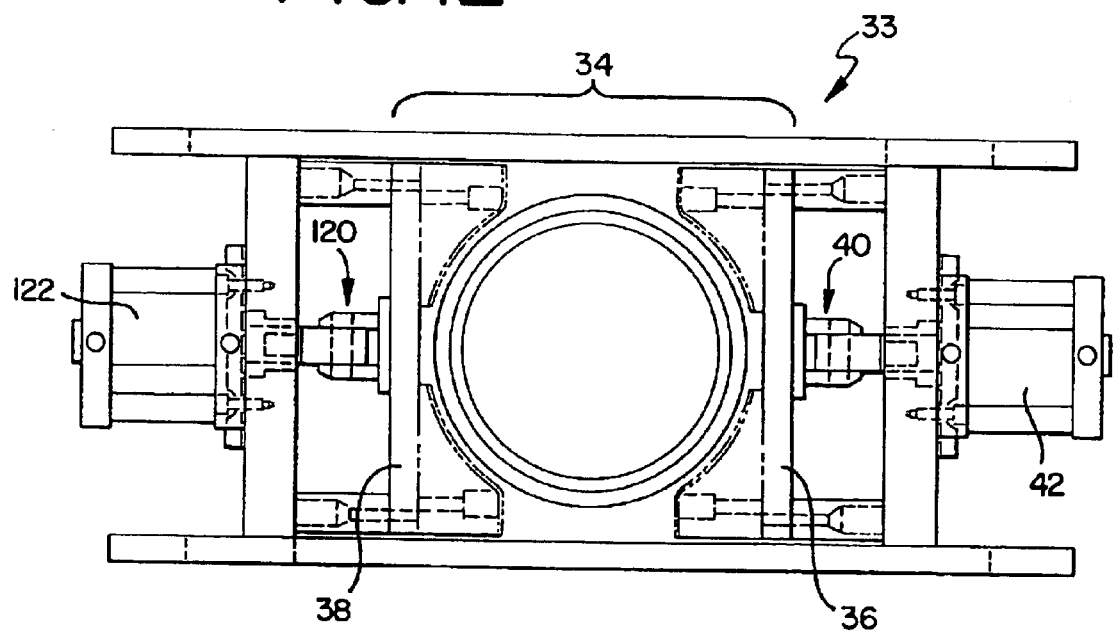
FIG. 12 is a top view of an alternate embodiment of the clamp assembly 33 of FIG. 3 showing the clamp 34, a first ram 40 and cylinder 42, and a second ram 120 and cylinder 122.

In another embodiment shown in FIG. 12, the clamp assembly 33 includes a second ram 120 and a second cylinder 122 operatively connected to the clamp 34 such that the clamp 34 can be clampingly engaged about a container 12 by relative movement of either of the rams 40, 120 and the cylinders 42, 122. One of ordinary skill in the art will recognize that the second ram 120 and second cylinder 122 could be replaced by a motor, a crank, a crank with gears, or any equivalent capable of displacing the second member 38 towards the first member 36. One of ordinary skill in the art will also recognize that the addition of the second ram 120 and cylinder 122 remains in conformity with the principles of the invention. Thus, the addition of a second ram 120 and second cylinder 122 is consistent with the structure and operation of the various embodiments of the engaging surfaces and seats disclosed in the preceding paragraphs.

Figure 13:
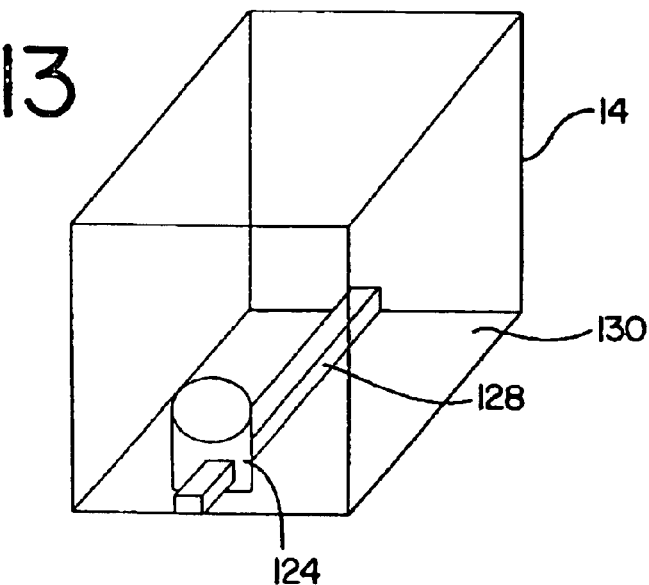
FIG. 13 is a three-dimensional plan view in perspective showing an alternate embodiment of a first support cylinder 124 adapted for slidable engagement with a rail 128 in the tank 14.
Figure 14:
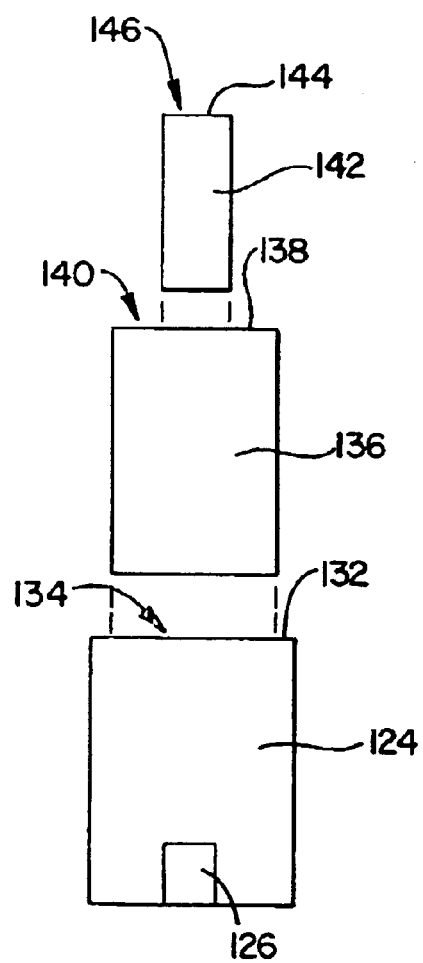
FIG. 14 is an exploded plan view showing the nesting of a second cylinder 136 and a third cylinder 142 in the first cylinder 124 of FIG. 13.

In another embodiment shown in FIGS. 13 and 14, the apparatus 10 includes a first support cylinder 124 having a channel 126 adapted for cooperative sliding engagement with a rail 128 positioned on a bottom surface 130 of the tank 14. The first support cylinder 124 has a first terminal edge 132 which defines a first seat 134. The first seat 134 is adapted to support at least a portion of a first-sized container such that at least a portion of the first-sized container will remain extended in the tank 14 as the first member 36 engages the first-sized container 12. A second support cylinder 136 may be disposed in the first support cylinder 124. The second support cylinder 136 has a second terminal edge 138 which defines a second seat 140. The second seat 140 is adapted to support at least a portion of a second-sized container such that at least a portion of the second-sized container will remain extended in the tank 14 as the first member 36 engages the second-sized container. A third support cylinder 142 is disposed in the second support cylinder 136. The third support cylinder 142 has a third terminal edge 144 which defines a third seat 146. The third seat 146 is adapted to support at least a portion of a third-sized container such that at least a portion of the third-sized container will remain extended in the tank 14 as the first member 36 engages the third-sized container. One of ordinary skill in the art will also recognize that the support cylinders 124, 136, 146 can be employed to replace or in combination with seats formed from a plate, but the cylinders 124, 136, 146 remain in conformity with the principles of the invention. Specifically, the various embodiments of the inserts disclosed in the preceding paragraphs are applicable when the support cylinders 124, 136, 146 are employed.

Figure 15:
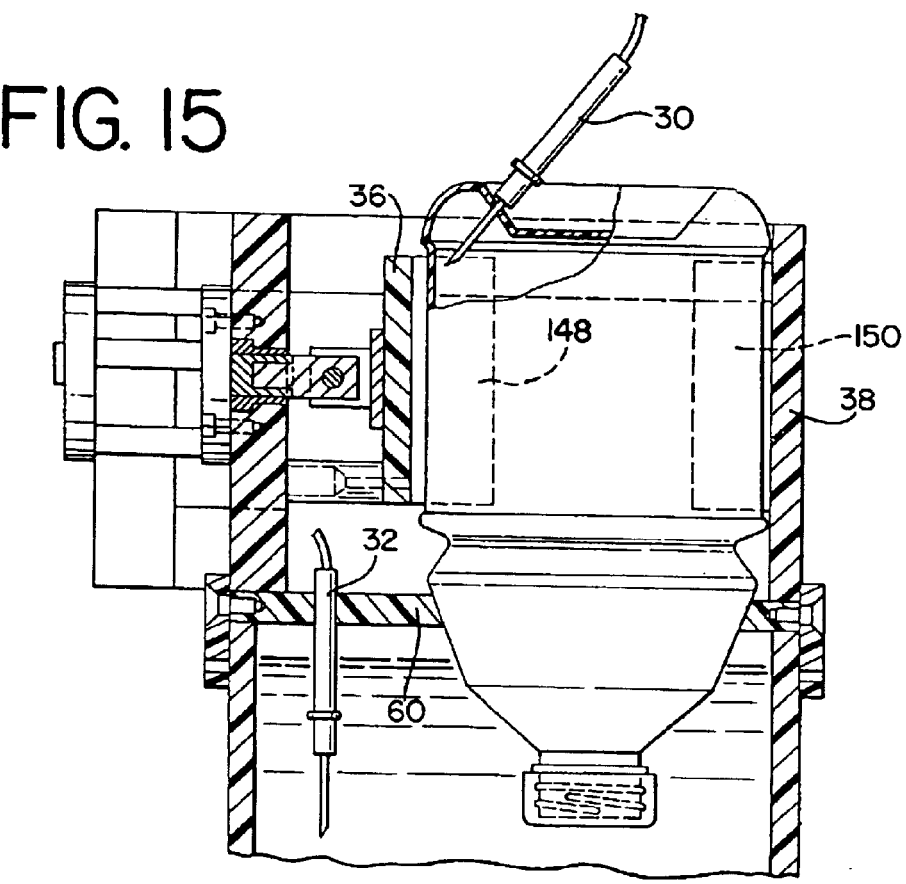
FIG. 15 is a cross-sectional view of the clamp assembly 33 of FIG. 3 along line 15—15, showing a first pair of inserts 148, 150 engaging a first-sized container; and, FIG. 16 is a cross-sectional view of the clamp assembly 33 of FIG. 3 along line 16—16, showing a second pair of inserts 152, 154 engaging a second-sized container.
Figure 16:
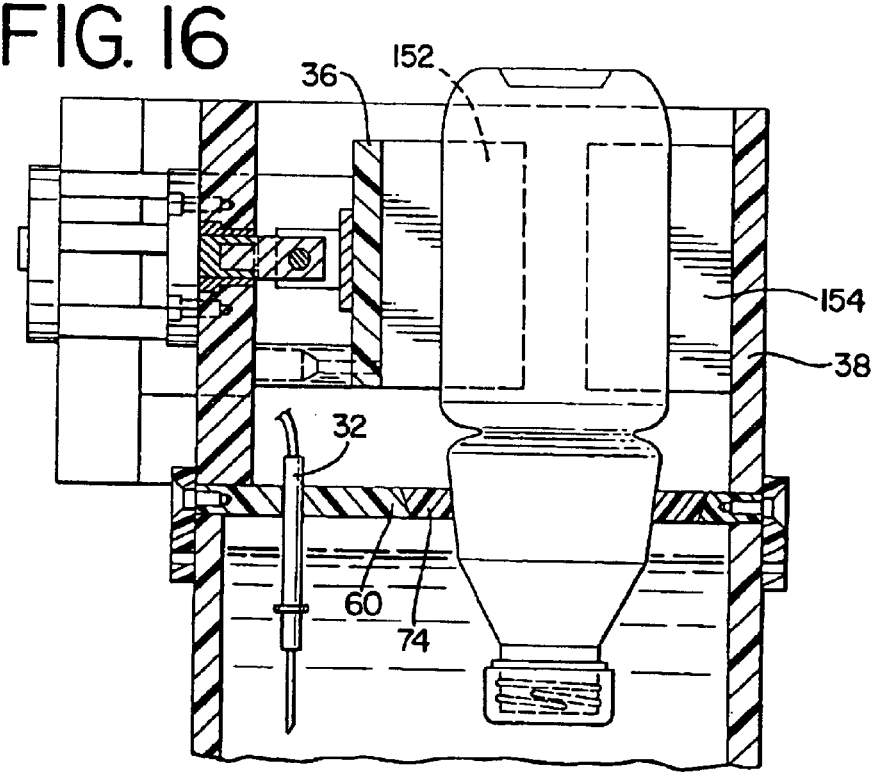

In another embodiment disclosed in FIGS. 15 and 16, the apparatus 10 includes a first pair of inserts 148 removably attached to the first member 36. A first pair of inserts 150 is removably attached to the second member 38. The first pair of inserts 148, 150 are adapted to conform to at least a portion of an outer surface of a first-sized container and preferably, have the same overall configuration and dimensions. To conform to at least a portion of an outer surface of a second-sized container, a second pair of inserts 152 is removably attached to the first member 36. A second pair of inserts 154 is removably attached to the second member 38. The second pair of inserts 152, 154 are adapted to conform to at least a portion of an outer surface of a second-sized container and preferably, have the same overall configuration and dimensions. The inserts 148, 150, 152, 154 enhance the ability of the clamp 34 to engage different sized containers. One of ordinary skill in the art will recognize that the inserts 148, 150, 152, 154 are interchangeable and that the seats 64, 74, 84 are nested, meaning that the largest seat houses the intermediate seat which houses the smallest seat. As such, the operator can select the proper combination of inserts 148, 150, 152, 154 and seats 64, 74, 84 to permit the apparatus 10 to evaluate the seals on different sized containers.

A preferred method for evaluating the integrity of a seal on a liquid-filled container includes the following steps. Placing a container in a clamp 34 such that at least a portion of the container properly engaged in the clamp 34 extends into a tank 14 containing a electrolyte solution. Activating the clamp 34 to clampingly engage an outer surface of the container. Making an opening in a bottom surface of the container. Inserting a first electrode 30 into the container through the opening, such that at least a portion of the first electrode 30 is immersed in the solution. Placing a second electrode 32 in the solution in the tank. Connecting the first electrode 30 and the second electrode 32 to a conductivity meter 18. Causing electric current to flow from the meter 18 to either the first electrode 30 or the second electrode 32. Measuring the electrical conductivity from one electrode to another and the solution with the meter 18.

In an alternate embodiment for evaluating a container seal, a container having a closure is clamped while at least the closure remains submersed in a solution. An opening is made in a wall of the container while the container remains clamped and while the closure remains submersed in the solution. A first electrode is inserted into the opening in the container wall. A second electrode is placed or inserted in the solution. The first and second electrodes are connected to a conductivity meter. The conductivity meter is used to measure the electron flow between the first electrode, the second electrode, and the solution.

While specific embodiments have been illustrated and described, numerous modifications are possible without departing from the spirit of the invention, and the scope of protection is only limited by the scope of the accompanying claims.

As disclosed above, the various configurations of the seat 43 and inserts 44, 90, 96, 18, 150, 152, 154 enable the apparatus 10 to evaluate the seals on containers of different sizes and shapes. Specifically, the apparatus 10 is capable of evaluating containers with capacities ranging from 8 to 128 ounces. However, by increasing the size of the components of the apparatus 10, including the tank 14, the clamp assembly 33, the clamp 34, the seat 43, and the inserts, the apparatus 10 can be used to evaluate containers larger than 128 ounces. Also, the apparatus 10 is capable of evaluating containers other than circular, including containers that are ellipsoidal, square, triangular, or rectangular. However, it may be desired to modify certain features, such as the shape of the engaging surfaces and the apertures to better accommodate a particular shape. For example, at least one engaging surface could define a "V" shape to better accommodate a triangular-shaped container. The ability to evaluate containers of varying size and shape increases the versatility and value of the apparatus 10.

We claim:

1. An apparatus for evaluating the integrity of a seal on a liquid-filled container having a closure, the apparatus comprising:

a clamp having a first and second member for securing a container be the members;

a ram connected to the clamp to provide relative movement between the first and second members;

a liquid-filled tank situated with respect to the clamp such that at least portion of the container having the closure extends into the tank such that the closure of the container is submerged in the liquid;

means for forming an aperture in the container while being secured in the clamp; and, a support for the aperture forming means, the support being configured to accommodate vertical and horizontal movement of the means for forming an aperture.

2. The apparatus of claim 1 wherein the ram is actuated by one of the group consisting of air pressure, hydraulic pressure, and electric motor.

3. The apparatus of claim 1 further comprising a seat to support a container in a desired position to be secured by the clamp.

4. The apparatus of claim 3 further comprising a support platform which as moveable along a floor surface on devices for reducing friction between a platform and the floor surface, the clamp and the tank being mounted on the platform.

5. The apparatus of claim 4 wherein the devices for reducing friction between the platform and the floor surface comprise a plurality of wheels.

6. The apparatus of claim 4 wherein the platform comprises at least one connector for removably connecting the apparatus to a source of electricity.

7. The apparatus of claim 4 wherein the platform comprises at least one connector for removably connecting the apparatus to a source of pressurized air.

8. The apparatus of claim 3 further comprising:

a conductivity evaluating instrument including a first and second electrode, the first electrode being integrated with the means for forming an aperture such that when the means for forming an aperture, penetrates a wall of a container, the first electrode is in contact with the liquid in the container without removing the means for forming an aperture from the container; and, the second electrode of the instrument being immersed in the liquid in the tank.

9. The apparatus of claim 8 wherein the means for forming an aperture in a container is selected from the group consisting of a drill, a heated lance, a mechanical punch and an electrode.

10. The apparatus of claim 3, further comprising:

a conductivity evaluating instrument including a first and second electrode, the first electrode being moveable and sized such that it can be inserted into an aperture formed in the container and extend into the liquid in the container; and, the second electrode of the instrument being immersed in the liquid in the tank.

11. The apparatus of claim 10 wherein the means for forming an aperture in a container is selected from the group consisting of a drill, a heated lance, a mechanical punch and an electrode.

12. The apparatus of claim 1 further comprising a support platform which is moveable along a floor surface on devices for reducing friction between a platform and the floor surface, the clamp and the tank being mounted on the platform.

13. The apparatus of claim 12 wherein the devices for reducing friction between the platform and the floor surface comprise a plurality of wheels.

14. The apparatus of claim 12 wherein the platform comprises at least one connector for removably connecting the apparatus to a source of electricity.

15. The apparatus of claim 12 wherein the platform comprises at least one connector for removably connecting the apparatus to a source of pressurized air.

16. The apparatus of claim 1 further comprising:

a conductivity evaluating instrument including a first and second electrode, the first electrode being integrated with the means for forming an aperture such that when the means for forming an aperture penetrates a wall of a container, the first electrode is in contact with the liquid in the container without removing the means for forming an aperture from the container; and, the second electrode of the instrument being immersed in the liquid in the tank.

17. The apparatus of claim 16 wherein the means for forming an aperture in a container is selected from the group consisting of a drill, a heated lance, a mechanical punch and an electrode.

18. The apparatus of claim 1 further comprising:

a conductivity evaluating instrument including a first and second electrode, the first electrode being moveable and sized such that it can be inserted into an aperture formed in the container and extend into the liquid in the container; and, the second electrode of the instrument being immersed in the liquid in the tank.

19. The apparatus of claim 18 wherein the means for forming an aperture in a container is selected from the group consisting of a drill, a heated lance, a mechanical punch and an electrode.

20. An apparatus for evaluating the integrity of a seal on a liquid-filled container having a closure, the apparatus comprising:

a clamp having a first and second member for securing a container between the members;

a ram connected to the clamp to provide relative movement between the first and second members;

a liquid-filled tank situated with respect to the clamp such that at least a portion of the container having the closure extends into the tank such that the closure of the container is submerged in the liquid;

a seat to support the container in a desired position to be secured by the clamp;

means for forming an aperture in the container while being secured in the clamp; and, a support for the aperture forming means, the support being configured to accommodate vertical and horizontal movement of the means for forming an aperture.

21. The apparatus of claim 20 wherein the ram is actuated by one of the group consisting of air pressure, hydraulic pressure, and electric motor.

22. The apparatus of claim 20 further comprising a support platform which is moveable along a floor surface, the clamp and the tank being mounted on the platform.

23. The apparatus of claim 20 further comprising:

a conductivity evaluating instrument including a first and second electrode, the first electrode being integrated with the means for forming an aperture such that when the means for forming an aperture penetrates a wall of a container, the first electrode is in contact with the liquid in the container without removing the means for forming an aperture from the container; and, the second electrode of the instrument being immersed in the liquid in the tank.

24. The apparatus of claim 20 further comprising:

a conductivity evaluating instrument including a first and second electrode, the first electrode being moveable and sized such that it can be inserted into an aperture formed in the container and extend into the liquid in the container; and, the second electrode of the instrument being immersed in the liquid in the tank.

25. The apparatus of claim 20 wherein the means for forming an aperture in a container is selected from the group consisting of a drill, a heated lance, a mechanical punch and an electrode.

* * * * *